United States Patent
Wiederin et al.

(10) Patent No.: US 12,219,687 B2
(45) Date of Patent: Feb. 4, 2025

(54) INDUCTIVELY COUPLED PLASMA TORCH STRUCTURE WITH FLARED OUTLET

(71) Applicant: Elemental Scientific, Inc., Omaha, NE (US)

(72) Inventors: Daniel R. Wiederin, Omaha, NE (US); Gary J. Barrett, Omaha, NE (US); Kevin Wiederin, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 0 days.

(21) Appl. No.: 17/726,018

(22) Filed: Apr. 21, 2022

(65) Prior Publication Data

US 2022/0344142 A1    Oct. 27, 2022

Related U.S. Application Data

(60) Provisional application No. 63/179,715, filed on Apr. 26, 2021, provisional application No. 63/179,759,
(Continued)

(51) Int. Cl.
*H05H 1/22* (2006.01)
*G01N 21/73* (2006.01)
(Continued)

(52) U.S. Cl.
CPC ............... *H05H 1/22* (2013.01); *G01N 21/73* (2013.01); *H01J 49/105* (2013.01);
(Continued)

(58) Field of Classification Search
CPC .. H05H 1/22; H05H 1/28; H05H 1/30; H05H 1/3423; H01J 49/105; G01N 21/73
See application file for complete search history.

(56) References Cited

U.S. PATENT DOCUMENTS

| | | | | |
|---|---|---|---|---|
| 5,012,065 A | * | 4/1991 | Rayson | H05H 1/30 219/121.48 |
| 5,233,156 A | * | 8/1993 | Chan | H05H 1/42 219/121.52 |

(Continued)

FOREIGN PATENT DOCUMENTS

| | | |
|---|---|---|
| KR | 940013704 A | 7/1994 |
| KR | 20120025196 A | 3/2012 |

OTHER PUBLICATIONS

Gray, A Ian. "Stabilization of an Inductively Coupled Plasma for Inductively Coupled Plasma Mass Spectrometry with a Flared Torch Extension", Journal of Analytical Atomic Spectrometry, Oct. 1992, vol. 7, p. 1151-1153 (Year: 1992).*

(Continued)

*Primary Examiner* — David E Smith
(74) *Attorney, Agent, or Firm* — Kevin E. West; Advent, LLP

(57) ABSTRACT

An inductively coupled plasma (ICP) torch is described that includes a tapered outer end. A system embodiment includes, but is not limited to, a tubular sample injector configured to receive an aerosolized sample in an interior defined by walls of the tubular sample injector; an inner tube surrounding at least a portion of the tubular sample injector to form a first annular space between the inner tube and the walls of the tubular sample injector, the inner tube defining at least one inlet port for introduction of an auxiliary gas into the first annular space; and an outer tube surrounding at least a portion of the inner tube to form a second annular space, the outer tube defining at least one inlet port for introduction of a cooling gas into the second annular space, the outer tube having a flared region at an outlet of the outer tube.

20 Claims, 11 Drawing Sheets

Figure 1:
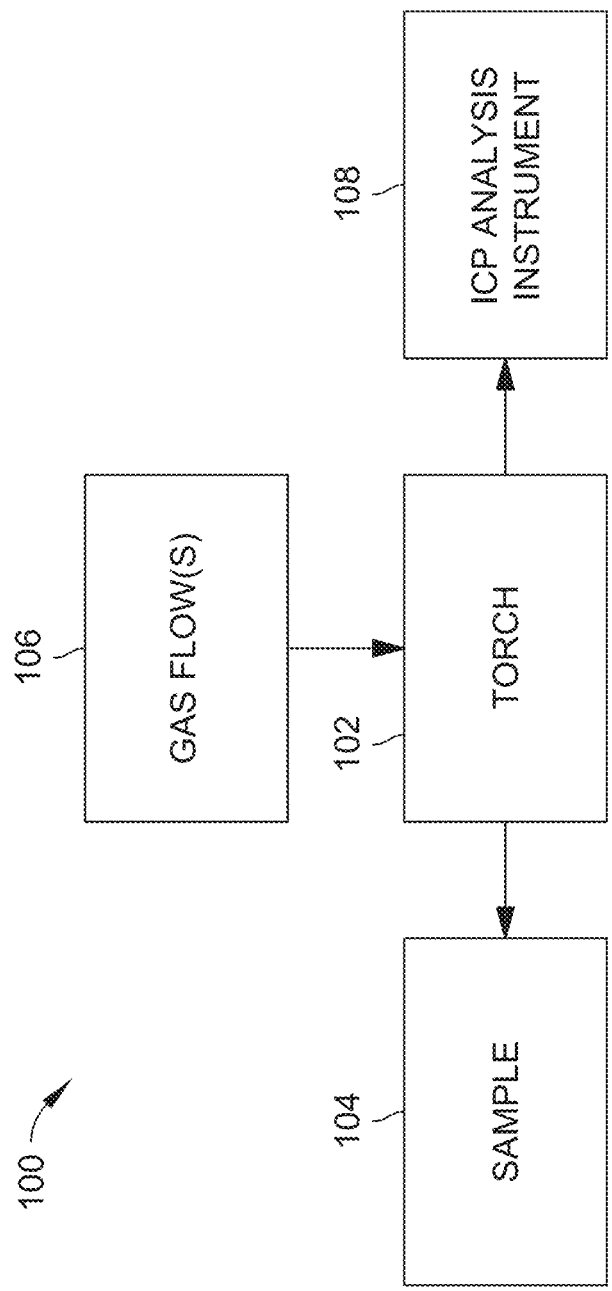
Figure 2:
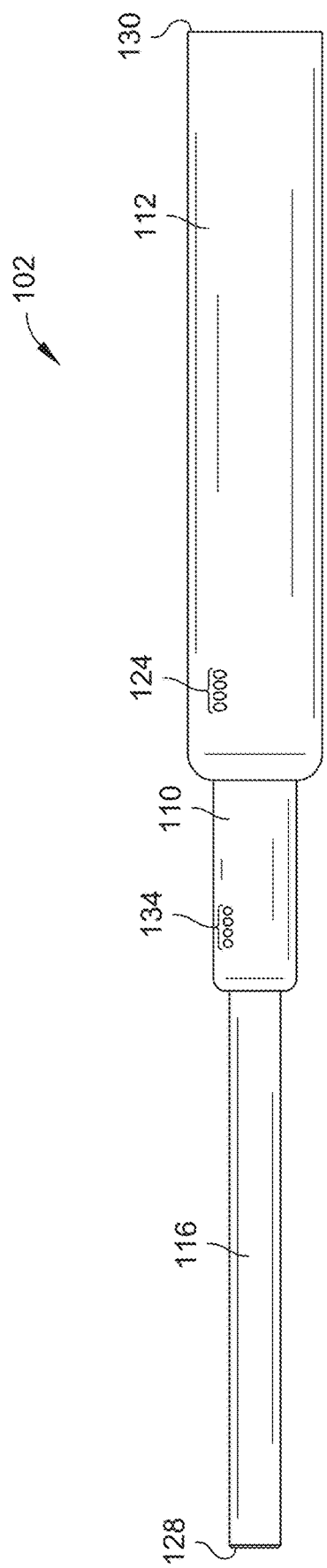

Related U.S. Application Data filed on Apr. 26, 2021, provisional application No. 63/179,827, filed on Apr. 26, 2021.

(51) Int. Cl.
| | |
|---|---|
| *H01J 49/10* | (2006.01) |
| *H05H 1/24* | (2006.01) |
| *H05H 1/28* | (2006.01) |
| *H05H 1/30* | (2006.01) |
| *H05H 1/34* | (2006.01) |

(52) U.S. Cl.
CPC .......... *H05H 1/2465* (2021.05); *H05H 1/28* (2013.01); *H05H 1/30* (2013.01); *H05H 1/3423* (2021.05)

(56) References Cited

U.S. PATENT DOCUMENTS

| | | | |
|---|---|---|---|
| 5,400,665 A | 3/1995 | Zhu et al. | |
| 6,166,379 A | 12/2000 | Montaser et al. | |
| 8,001,927 B2 | 8/2011 | Dorier et al. | |
| 8,232,500 B2* | 7/2012 | Brezni .................. | B23K 10/00 219/121.36 |
| 8,847,102 B2* | 9/2014 | Wiederin ................ | H05H 1/34 219/121.52 |
| 9,343,283 B1* | 5/2016 | Field ................... | H01J 49/0009 |
| 10,477,665 B2 | 11/2019 | Hadidi et al. | |
| 10,834,807 B1* | 11/2020 | Wiederin ................ | H05H 1/30 |
| 2011/0239429 A1* | 10/2011 | Hambek ............. | C04B 41/5346 29/402.01 |
| 2013/0319979 A1* | 12/2013 | Hamatani ................ | H05H 1/02 219/121.48 |
| 2014/0224984 A1 | 8/2014 | Morrisroe | |
| 2014/0227776 A1* | 8/2014 | Sharp ...................... | G01N 1/28 435/309.1 |
| 2018/0332697 A1* | 11/2018 | Bazargan ................. | H05H 1/28 |
| 2019/0317082 A1 | 10/2019 | Baranov et al. | |
| 2020/0144046 A1* | 5/2020 | Sugiyama ........... | H01J 49/0027 |

OTHER PUBLICATIONS

International Search Report and Written Opinion for Application No. PCT/US2022/025745, dated Aug. 11, 2022.

International Search Report and Written Opinion for Application No. PCT/US2022/025742, dated Aug. 12, 2022.

Miyahara et al., A new air-cooled argon/helium-compatible inductively coupled plasma torch, 2014, Analytical Sciences, 30, 231-235, available at https://doi.org/10.2116/analsci.30.231 (Year: 2014).

Products and Consumables for Spectro EOP/SOP, p. 1-12, 2013 Catalog Elemental Scientific.†

Alan L. Gray, Stabilization of an Inductively Coupled Plasma for Inductively Coupled Plasma Mass Spectrometry With a Flared Torch Extension, Oct. 1992, Journal of Analytical Atomic Spectrometry, vol. 7, pp. 1151-1153.†

Alan L. Gray et al., Inductively Coupled Plasma Source Mass Spectrometry Using Continuum Flow Ion Extraction, The Analyst, vol. 108, No. 1290, Sep. 1983, p. 1033-1050.†

\* cited by examiner
† cited by third party

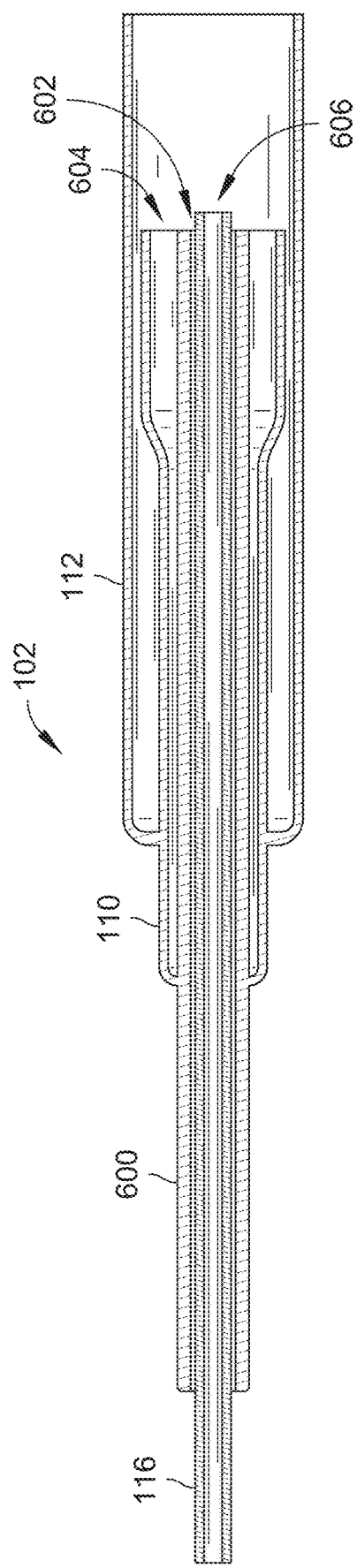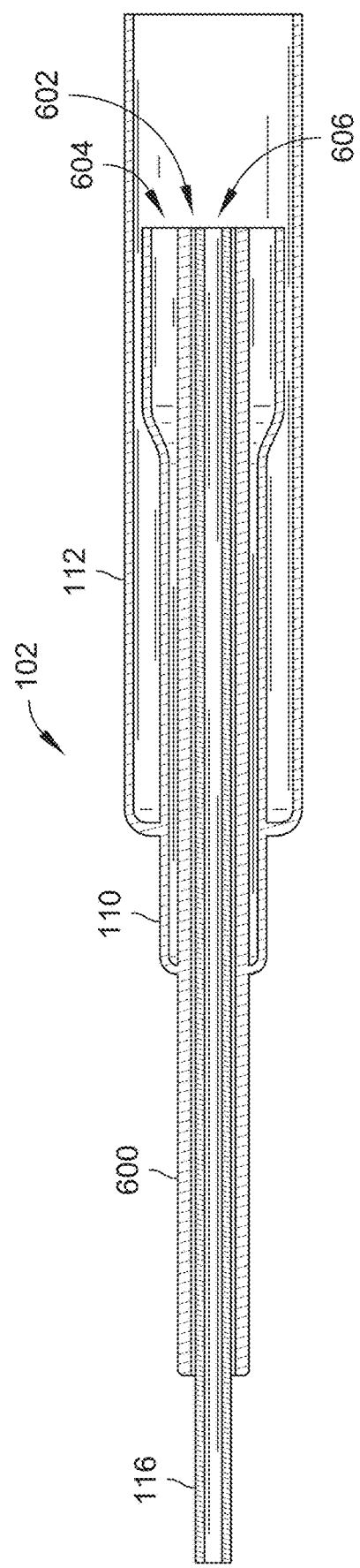
FIG. 6A
FIG. 6B

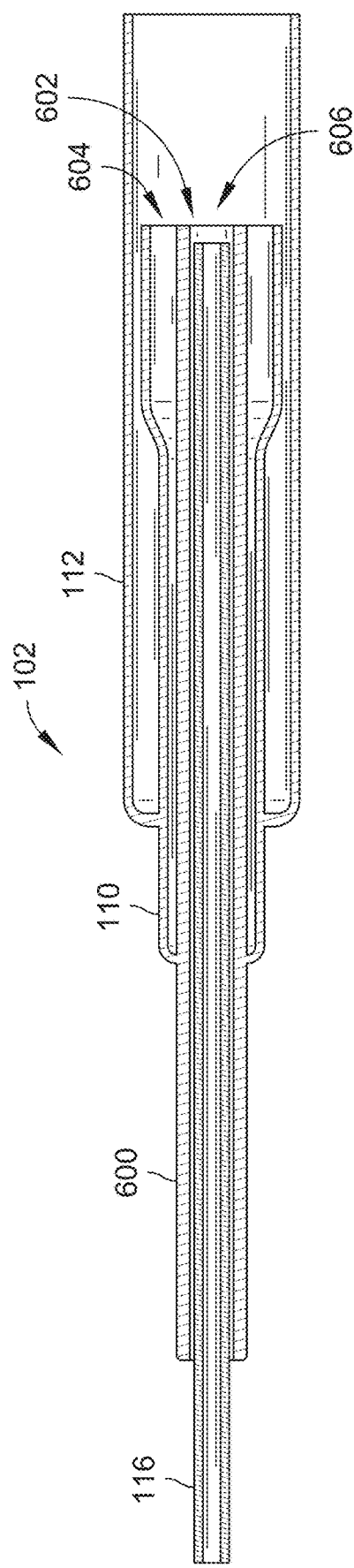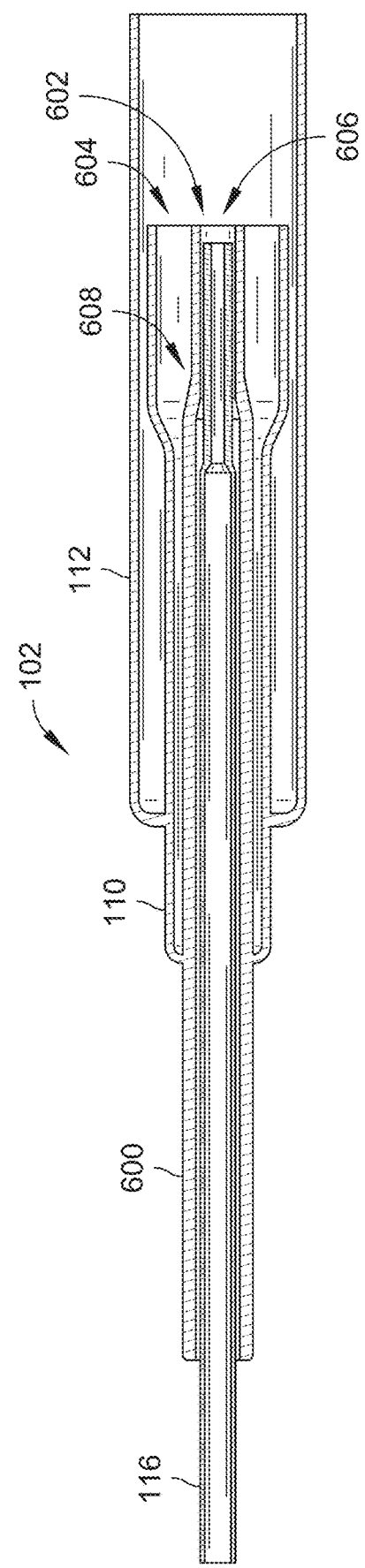

INDUCTIVELY COUPLED PLASMA TORCH STRUCTURE WITH FLARED OUTLET

CROSS-REFERENCE TO RELATED APPLICATIONS

The present application claims the benefit of 35 U.S.C. § 119(e) of U.S. Provisional Application Ser. No. 63/179,715, filed Apr. 26, 2021, and titled "INDUCTIVELY COUPLED PLASMA TORCH STRUCTURE FOR LOW COOLING GAS FLOWS," U.S. Provisional Application Ser. No. 63/179,759, filed Apr. 26, 2021, and titled "ICP TORCH ASSEMBLY WITH PROTECTED INJECTOR," and U.S. Provisional Application Ser. No. 63/179,827, filed Apr. 26, 2021, and titled "FLARED LOW-FLOW TORCH FOR ICP AND ICPMS." U.S. Provisional Application Ser. Nos. 63/179,715, 63/179,759, and 63/179,827 are herein incorporated by reference in their entireties.

BACKGROUND

Inductively coupled plasma (ICP) mass spectroscopy is an analysis technique commonly used for the determination of trace element concentrations and isotope ratios in liquid samples. ICP mass spectroscopy employs electromagnetically generated partially ionized argon plasma which reaches a temperature of approximately 7000K. When a sample is introduced to the plasma, the high temperature causes sample atoms to become ionized or emit light. Since each chemical element produces a characteristic mass or emission spectrum, measuring said spectra allows the determination of the elemental composition of the original sample.

Sample introduction systems may be employed to introduce the liquid samples into the ICP mass spectroscopy instrumentation (e.g., an inductively coupled plasma mass spectrometer (ICP/ICPMS), an inductively coupled plasma atomic emission spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP mass spectrometry instrumentation. The aerosol is then sorted in a spray chamber to remove the larger aerosol particles. Upon leaving the spray chamber, the aerosol is introduced to the ICPMS or ICPAES instruments for analysis. Often, the sample introduction is automated to allow a large number of samples to be introduced into the ICP mass spectroscopy instrumentation in an efficient manner.

SUMMARY

An inductively coupled plasma (ICP) torch is described that facilitates laminar flow of a cooling gas introduced by a plurality of input ports between an outer tube and an inner tube configured to surround an injector for introduction of an aerosolized sample to a plasma. A system embodiment includes, but is not limited to, an inner tube; and an outer tube surrounding at least a portion of the inner tube to form an annular space, the outer tube defining a plurality of inlet ports for introduction of a cooling gas into the annular space as a laminar flow via each inlet port of the plurality of inlet ports.

A system embodiment includes, but is not limited to, a tubular sample injector configured to receive an aerosolized sample in an interior defined by walls of the tubular sample injector; an inner tube surrounding at least a portion of the tubular sample injector to form a first annular space between the inner tube and the walls of the tubular sample injector, the inner tube defining a first plurality of inlet ports for introduction of an auxiliary gas into the first annular space; and an outer tube surrounding at least a portion of the inner tube to form a second annular space, the outer tube defining a second plurality of inlet ports for introduction of a cooling gas into the second annular space as a laminar flow.

A method embodiment includes, but is not limited to, introducing an aerosolized sample to an interior of a tubular sample injector of an inductively coupled plasma torch, the inductively coupled plasma torch including an inner tube surrounding at least a portion of the tubular sample injector to form a first annular space between the inner tube and the walls of the tubular sample injector, the inner tube defining a first plurality of inlet ports for introduction of an auxiliary gas into the first annular space, and an outer tube surrounding at least a portion of the inner tube to form a second annular space, the outer tube defining a second plurality of inlet ports for introduction of a cooling gas into the second annular space; introducing the auxiliary gas into the first annular space of the inductively coupled plasma torch via the first plurality of inlet ports; and introducing the cooling gas at a flow rate of less than 12 L/min into the second annular space of the inductively coupled plasma torch via the second plurality of inlet ports.

An inductively coupled plasma (ICP) torch is described that includes an injector protector to shield an injector end during low cooling gas operation of the torch. A system embodiment includes, but is not limited to, a tubular sample injector configured to receive an aerosolized sample in an interior defined by walls of the tubular sample injector; an injector protector surrounding at least a portion of the tubular sample injector; an inner tube surrounding at least a portion of the injector protector to form a first annular space between the inner tube and the injector protector, the inner tube defining at least one inlet port for introduction of an auxiliary gas into the first annular space; and an outer tube surrounding at least a portion of the inner tube to form a second annular space, the outer tube defining at least one inlet port for introduction of a cooling gas into the second annular space.

A system embodiment includes, but is not limited to, a tubular sample injector configured to receive an aerosolized sample in an interior defined by walls of the tubular sample injector; an injector protector surrounding at least a portion of the tubular sample injector; an inner tube surrounding at least a portion of the injector protector to form a first annular space between the inner tube and the injector protector, the inner tube defining at least one inlet port for introduction of an auxiliary gas into the first annular space; an outer tube surrounding at least a portion of the inner tube to form a second annular space, the outer tube defining at least one inlet port for introduction of a cooling gas into the second annular space; and a gas introduction sheath coupled to an input end of each of the tubular sample injector and the injector protector for introduction of a gas between the tubular sample injector and the injector protector, the gas introduction sheath defining a gas inlet port configured to receive the gas for introduction to a third annular space defined between the injector protector and the tubular sample injector.

A method embodiment includes, but is not limited to, introducing an aerosolized sample to an interior of a tubular sample injector of an inductively coupled plasma torch, the inductively coupled plasma torch including an injector protector surrounding at least a portion of the tubular sample injector, an inner tube surrounding at least a portion of the injector protector to form a first annular space between the inner tube and the injector protector, the inner tube defining at least one inlet port for introduction of an auxiliary gas into the first annular space, and an outer tube surrounding at least a portion of the inner tube to form a second annular space, the outer tube defining at least one inlet port for introduction of a cooling gas into the second annular space; introducing the auxiliary gas into the first annular space of the inductively coupled plasma torch via the at least one inlet port of the inner tube; and introducing the cooling gas at a flow rate of less than 12 L/min into the second annular space of the inductively coupled plasma torch via the at least one inlet port of the outer tube.

An inductively coupled plasma (ICP) torch is described that includes a tapered outer end of an outer tube to space the outer end away from the plasma during low cooling gas operation of the torch. A system embodiment includes, but is not limited to, a tubular sample injector configured to receive an aerosolized sample in an interior defined by walls of the tubular sample injector; an inner tube surrounding at least a portion of the tubular sample injector to form a first annular space between the inner tube and the walls of the tubular sample injector, the inner tube defining at least one inlet port for introduction of an auxiliary gas into the first annular space; and an outer tube surrounding at least a portion of the inner tube to form a second annular space, the outer tube defining at least one inlet port for introduction of a cooling gas into the second annular space, the outer tube having a flared region at an outlet of the outer tube.

A system embodiment includes, but is not limited to, an inner tube configured to receive at least a portion of a tubular sample injector; and an outer tube surrounding at least a portion of the inner tube to form an annular space, the outer tube defining at least one inlet port for introduction of a cooling gas into the annular space, the outer tube having a flared region at an outlet of the outer tube, wherein the flared region is positioned downstream from an outlet end of the inner tube, the outlet end of the inner tube positioned within the outer tube.

A method embodiment includes, but is not limited to, introducing an aerosolized sample to an interior of a tubular sample injector of an inductively coupled plasma torch, the inductively coupled plasma torch including an inner tube surrounding at least a portion of the tubular sample injector to form a first annular space between the inner tube and the walls of the tubular sample injector, the inner tube defining at least one inlet port for introduction of an auxiliary gas into the first annular space, and an outer tube surrounding at least a portion of the inner tube to form a second annular space, the outer tube defining at least one inlet port for introduction of a cooling gas into the second annular space, the outer tube having a flared region at an outlet of the outer tube; introducing the auxiliary gas into the first annular space of the inductively coupled plasma torch via the at least one inlet port of the inner tube; and introducing the cooling gas at a flow rate of less than 12 L/min into the second annular space of the inductively coupled plasma torch via the at least one inlet port of the outer tube.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures.

FIG. 1 is a schematic illustration of a sample analysis system using an ICP torch in accordance with example implementations of the present disclosure.

FIG. 2 is a side view of an ICP torch in accordance with example implementations of the present disclosure.

FIG. 3 is a partial cross-sectional side view of the ICP torch of FIG. 2.

FIG. 4 is a cross-sectional end view of the ICP torch of FIG. 2, taken along line 4-4 shown in FIG. 3.

FIG. 5 is a partial isometric view of an ICP torch in accordance with example implementations of the present disclosure.

FIG. 6A is a cross-sectional side view of an ICP torch having an injector protector tube in accordance with example implementations of the present disclosure.

FIG. 6B is a cross-sectional side view of the ICP torch of FIG. 6A having an end of the injector protector tube substantially flush with an end of the injector in accordance with example implementations of the present disclosure.

FIG. 6C is a cross-sectional side view of the ICP torch of FIG. 6A having an end of the injector protector tube extending beyond an end of the injector in accordance with example implementations of the present disclosure.

FIG. 6D is a cross-sectional side view of an ICP torch having an end of a tapered injector protector tube extending beyond an end of a tapered injector in accordance with example implementations of the present disclosure.

FIG. 7A is an isometric view of the ICP torch of FIG. 6C having a gas introduction sheath coupled to a sample introduction end of ICP torch in accordance with example implementations of the present disclosure.

FIG. 7B is a cross-sectional side view of the ICP torch of FIG. 7A.

FIG. 8A is an isometric view of ICP torch having a flared outlet in accordance with example implementations of the present disclosure.

FIG. 8B is a cross-sectional side view of the ICP torch of FIG. 8A.

FIG. 9A is a photograph of experimental results of an ICP torch outlet having a cylindrical non-flared outlet illustrating devitrification and deposition after a period of operational use.

FIG. 9B is a photograph of experimental results of an ICP torch having a flared outlet illustrating minimized damage after being subjected to the same period of operational use as performed on the torch of FIG. 9A.

DETAILED DESCRIPTION

Overview

ICP spectroscopy instrumentation, such as inductively coupled plasma mass spectrometers (ICP/ICPMS), inductively coupled plasma atomic emission spectrometers (ICP-AES), and inductively coupled plasma optical emission spectrometers (ICP-OES), utilize argon gas (Ar) to sustain the plasma generated to ionize an aerosolized sample and to cool the torch from the high temperatures generated by the torch to analyze the samples. For instance, the temperature of the ICP may exceed 8000K, which is above the melting point of the torch material, which can be constructed from materials such as quartz, alumina, silicon nitride, or other ceramic or glassy materials. The main argon gas flow, sometimes referred to as plasma gas or cool gas, enters an annular gap between two torch tubes and helps to thermally isolate the torch material from the plasma to prevent early degradation (sometimes referred to as devitrification), melting, or other damage that would require replacement or potentially introduce contaminants to a sample during analysis. However, if the flow rate of the gas is too low, the plasma formed by the torch can encroach on the end of the torch tubes or on the end of the sample injector positioned concentrically within the torch tubes, which can cause devitrification or other damage to the torch tubes and/or sample injector.

Additionally, ICP instrumentation can be utilized to process large numbers of samples during bulk sample analysis periods that cause the ICP torch to have continuous or substantially continuous operation periods. These operation periods can have constant or substantially constant flows of gas, such as Argon gas, and electricity to maintain the plasma within the ICP torch, which incurs costs of operating the ICP instrumentation. Moreover, in general, as the ionization power of the ICP torch increases, more electricity is required to sustain the plasma, increasing the cost of operating the ICP torch as compared to operating the ICP torch for the same duration at lower ionization power. The costs of operating ICP torches are often compounded when the torches are subjected to continuous or substantially continuous operation periods at gas flow rates high enough to position the plasma sufficiently far from the output end of the torch to prevent damage. Thus, use of traditional ICP torches over long operation periods can result in high Argon usage that is required to prevent damage to the torch from positioning of the plasma.

Accordingly, in one aspect, the present disclosure is directed to systems and methods for controlling the flow of ICP torch gas during introduction of the gas to the ICP torch and within the torch body. For example, the present disclosure can be directed to operation of an ICP torch utilizing low Ar cool gas flow rates to permit operation of the ICP at lower ionization power as compared to an ICP torch that introduces the cooling gas in a substantially turbulent manner. In implementations, the torch includes a plurality of inlet ports oriented substantially tangential to the annular space between an outer tube and an inner tube of the torch to supply cooling gas as a substantially laminar flow within the annular space as the cooling gas travels from a first end to a second end of the torch. The inlet ports can be arranged longitudinally along the outer tube of the torch. In implementations, the torch includes a second plurality of inlet ports oriented substantially tangential to the annular space between the inner tube and an injector of the torch to supply plasma gas to the torch.

Example Implementations

Referring generally to FIGS. 1 through 5, systems 100 are shown for analysis of samples utilizing an ICP torch to prepare the sample for analytic determinations. For instance, referring to FIG. 1 the system 100 is shown including an ICP torch (referred to herein as "torch 102") that receives a sample 104 and one or more gases 106 for preparation of the sample for analysis by ICP analysis instrument 108. The sample 104 can include an aerosolized sample for introduction to an injector of the torch 102. For example, the sample 104 can be transferred from a spray chamber used to remove larger aerosol particles that can negatively affect the plasma flame while permitting passage of a portion of the aerosolized sample to the torch 102. The gases 106 can include plasma gas (e.g., Ar), cooling or auxiliary gas (e.g., Ar, nitrogen ($N_2$), and the like), transfer gases, and the like. While the gases 106 can include Ar for use for one or more of the plasma gas, the cooling gas, and the transfer gas, it is contemplated that other gases may be used instead of, or in addition to, Ar in specific implementations. Example implementations of introducing the gases 106 to the torch 102 are described with reference to FIGS. 2-4.

Referring to FIGS. 2-5, the torch 102 is shown in accordance with example implementations of the present disclosure. The torch 102 generally includes an inner tube 110 and an outer tube 112 structured to control the flow of gases introduced to the torch 102. The inner tube 110 defines an interior 114 configured to receive an injector 116 used to introduce the aerosolized sample to the torch 102. The outer tube 112 surrounds at least a portion of the inner tube 110, with an annular region 118 formed between an outer surface 120 of the inner tube 110 and an inner surface 122 of the outer tube 112. The annular region 118 is configured to receive a flow of gas (e.g., cooling gas, plasma gas, etc.) into the torch 102, such as to facilitate plasma generation and to protect the material of the outer tube 112 from the heat of the plasma generated by the torch 102. The outer tube 112 includes a plurality of inlet ports 124 formed in a wall of the outer tube 112 between the inner surface 122 and an outer surface 126 of the outer tube 112. While FIGS. 2-5 show four inlet ports 124 formed in the outer tube 112, the disclosure is not limited to four inlet ports 124 and can include fewer than four inlet ports 124 (e.g., two inlet ports, three inlet ports) or more than four inlet ports 124 (e.g., five inlet ports, six inlet ports, seven inlet ports, and so on). Multiple inlet ports 124 can facilitate increased strength of gas introduced into the torch 102 to provide tangential flow while providing multiple inlets for such introduction under laminar flow conditions.

The inlet ports 124 are structured to direct the cooling gas into the annular region 118 between the inner tube 110 and the outer tube 112 in an orientation that permits laminar flow of the cooling gas within the torch 102. In implementations, one or more of the inlet ports 124 are arranged substantially tangent to the annular region 118 (e.g., an end of the inlet port 124 is substantially tangent to the inner surface 122 of the outer tube 112). In implementations, each of the inlet ports 124 are arranged substantially tangent to the annular region 118. The torch 102 can include the inlet ports 124 directed through the outer tube 112 to have an outlet within the annular region 118 oriented at a range of angles (e.g., shown as a in FIG. 4) to supply the cooling gas within the annular region 118. In implementations, the value of a can be from about 10 degrees to about 20 degrees.

In implementations, the torch 102 includes the inlet ports 124 arranged substantially longitudinally along the torch 102 between an inlet end 128 and an outlet end 130 of the torch 102. For example, FIGS. 2-5 show the inlet ports 124 arranged in a substantially linear pattern longitudinally disposed along the outer tube 112. While the inlet ports are shown as substantially circular cross sections arranged in a substantially linear pattern, the torch 102 is not limited to such configuration and can include other shapes and patterned arrangements (e.g., non-linear arrangements) to deliver cooling gas to the annular region 118 without departing from the scope of the present disclosure.

The inner tube 110 and the injector 116 define an annular region 132 within the interior 114 when the injector 116 is positioned within the interior 114. In implementations, the injector 116 and the inner tube 110 are fixedly coupled together, such as by being fused together as a unitary construction. In implementations, the injector 116 and the inner tube 110 are removably coupled together, such as by providing a demountable injector (e.g., a threaded demountable injector) that includes one or more mating features to screw into or otherwise removably couple to the inner tube 110. The injector 116 can be protected within the inner tube 110 which can permit optimization of central channel gas flow independent of the sample aerosol flow.

Figure 3:
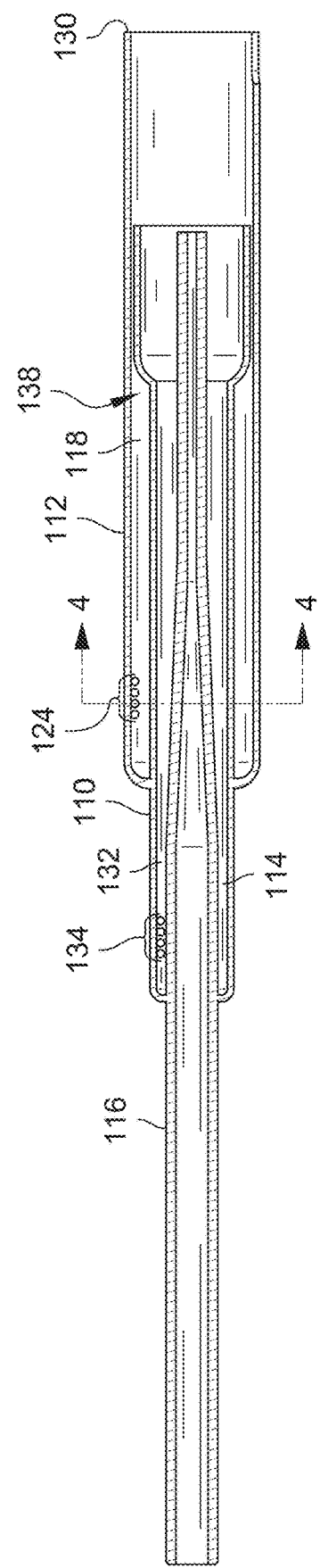
Figure 4:
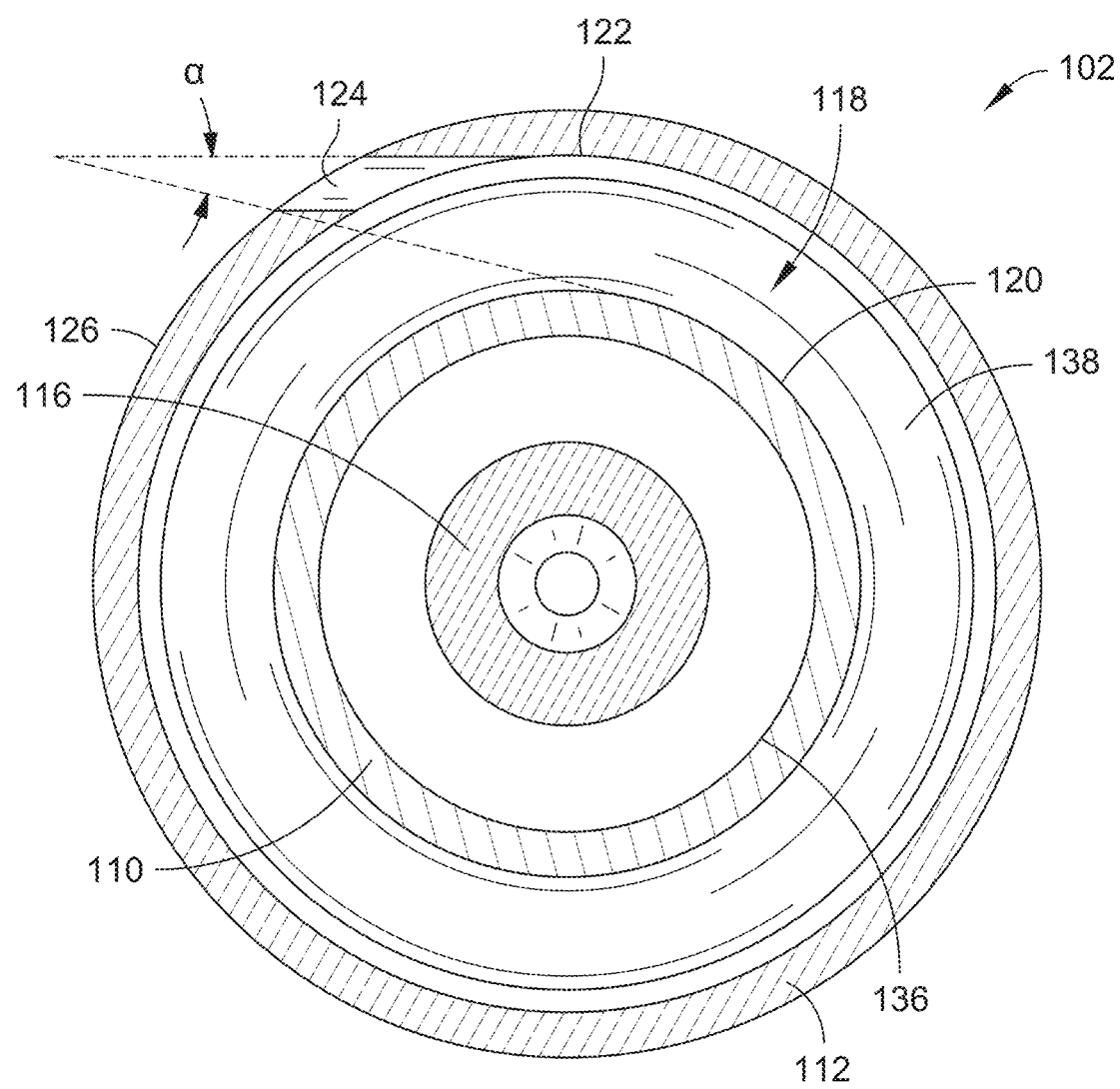

The inner tube 110 includes one or more features to receive auxiliary gas into the annular region 132 to support formation of the plasma by the torch 102. For example, the inner tube 110 is shown with a plurality of inlet ports 134 formed in a wall of the inner tube 110 between the outer surface 120 of the inner tube 110 and an inner surface 136 of the inner tube 112 configured to receive a flow of auxiliary gas into the torch 102, such as to support formation of the plasma by the torch 102 by adjusting the position of the plasma. While FIGS. 2-5 show four inlet ports 134 formed in the inner tube 110, the disclosure is not limited to four inlet ports 134 and can include fewer than four inlet ports 134 (e.g., two inlet ports, three inlet ports) or more than four inlet ports 134 (e.g., five inlet ports, six inlet ports, seven inlet ports, and so on). Alternatively, a single inlet port 134 is included in the inner tube 110. In implementations, one or more of the inlet ports 134 are arranged substantially tangent to the annular region 132 (e.g., an end of the inlet port 134 is substantially tangent to the inner surface 136 of the inner tube 110) to provide a substantially laminar flow of the auxiliary gas within the annular region 132. In implementations, each of the inlet ports 134 are arranged substantially tangent to the annular region 132. Similar to the orientation of the inlet ports 124, the torch 102 can include the inlet ports 134 directed through the inner tube 110 to have an outlet within the annular region 132 oriented at a range of angles to supply the auxiliary gas within the annular region 132. In implementations, the inner tube 110 expands outwardly towards the inner surface 122 of the outer tube 112 such that the annular region 118 has a smaller area as the torch 102 progresses from the inlet end 128 to the outlet end 130. For example, FIG. 3 shows an implementation of the inner tube 110 that includes a tuliped portion 138 that expands towards the outer tube 112, providing a smaller annular region 118 following the tuliped portion 138 towards the outlet end 130. In implementations, the inner tube 110 defines a gap between the outer surface 120 of the inner tube 110 and the inner surface 122 of the outer tube 112 following the tuliped portion 138 towards the outlet end 130 having a dimension of approximately 0.5 mm. Since the torch 102 facilitates operation at low cooling gas flow rates into the inlet ports 124 (e.g., less than 12 L/min), the relatively narrow gap between the outer surface 120 of the inner tube 110 and the inner surface 122 of the outer tube 112 can increase the velocity of the gas following the tuliped portion 138 to sustain plasma formation at the low cooling gas flow rates, thereby decreasing cooling gas usage to operate the torch 102 as compared to torches that require greater than 12 L/min cooling gas flow rates to operate.

In implementations, portions of the torch 102 can be formed as a unitary piece. For example, the outer tube 112 can be fused to a portion of the inner tube 110 to hold the outer tube 112 fixed with respect to the inner tube 110. Alternatively or additionally, the inner tube 110 can be fused to a portion of the injector 116.

Figure 5:
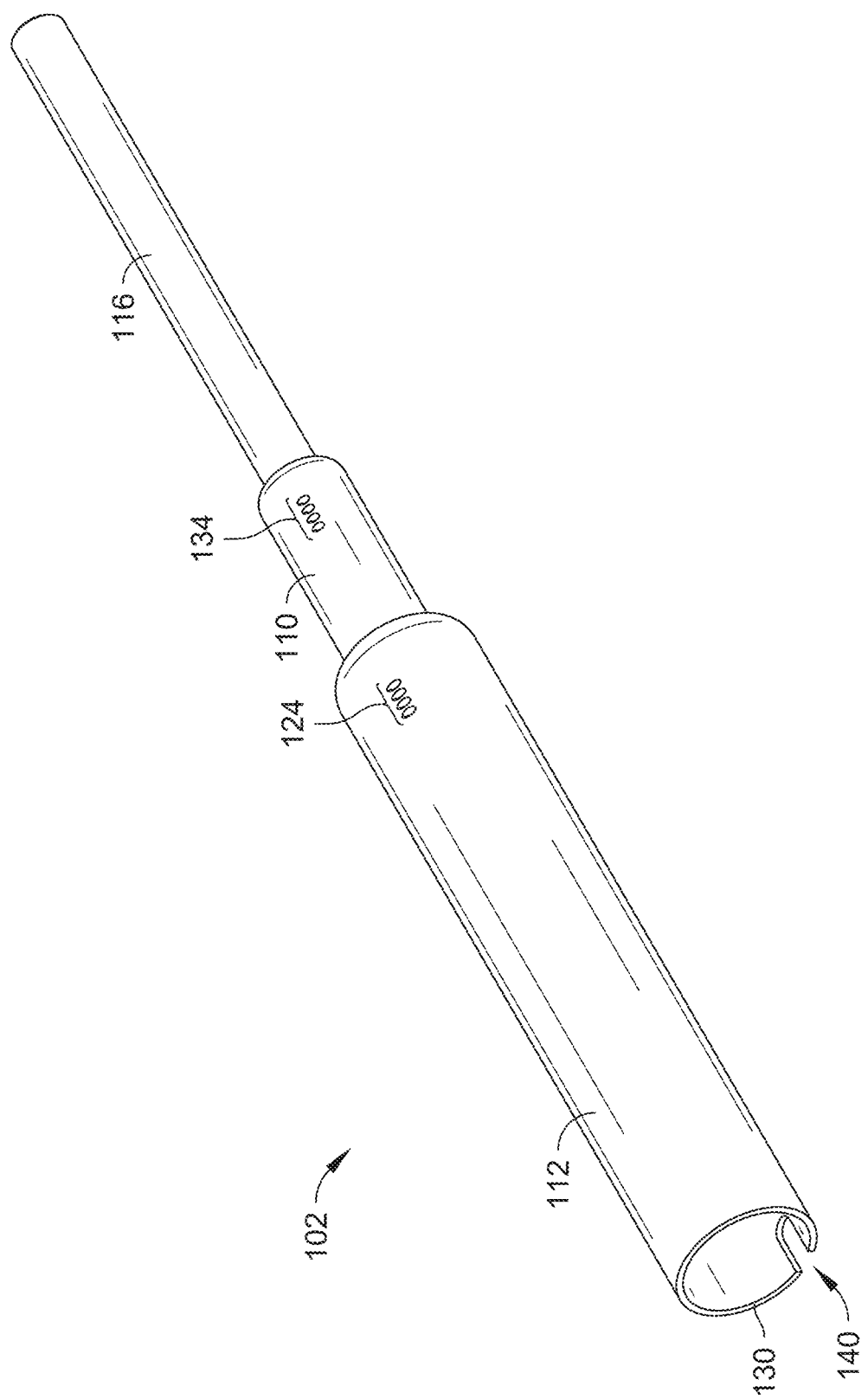

In implementations, shown in FIG. 5, the torch 102 can include an ignition hole 140 formed in the outer tube 112 to provide access to an interior of the torch 102 for a spark or other ignition source to ignite the plasma for operation of the system 100. In implementations, all or portions of the torch 102 can be formed from a doped quartz glass material including, but not limited to, cerium-doped quartz. Alternatively or additionally, all or portions of the troch 102 can be formed from other materials, including, but not limited to, alumina, platinum, sapphire, and the like.

The torch 102 has demonstrated a high degree of plasma robustness during low gas flows, such as during low flow of the cooling gas into the inlet ports 124. For example, the torch 102 can be utilized with cooling gas flow rates into the inlet ports 124 of less than 12 L/min. In implementations, the flow rate of cooling gas into the inlet ports 124 is from about 5 L/min to about 12 L/min. The torch 102 has demonstrated a high degree of plasma robustness during low RF power supplied to a coil surrounding the torch 102. For example, the torch provided an ionization power at approximately 1000 W. The torch 102 has demonstrated a high degree of plasma robustness during low RF power supplied to a coil surrounding the torch 102 in combination with low gas flow introduction to the torch 102. In implementations, the plasma robustness permits the torch 102 to not include a viewing slot, which can provide for a shorter torch 102 (e.g., length of the torch) as compared to torches that include a viewing slot. In implementations, the plasma robustness permits the torch 102 to utilize a single injector for organic and inorganic applications, which provides an increased residence time for organic applications that typically use a narrower injector. For instance, the injectors configured for use with the torch 102 can provide a reduced organic sample injection velocity, which increases residence time in the ICP for improved matrix tolerance.

In implementations, the torch 102 can include an injector protector tube within the inner tube 110 and surrounding at least a portion of the injector 116 to insulate and shield the injector 116 from the plasma, thereby reducing the opportunity for the injector 116 to overheat and/or otherwise contribute possible measurable contaminants to the ICPMS mass spectrum. For example, the torch 102 is shown in FIGS. 6A through 6D having an injector protector 600 within the inner tube 110 and surrounding at least a portion of the injector 116, with the injector protector 600 positioned between the injector 116 and the inner tube 110, and with the inner tube 110 positioned between the injector protector 600 and the outer tube 112. In implementations, the outer tube 112, the inner tube 110, the injector protector 600, and the injector 116 are concentrically arranged, listed in their outside-in order.

The injector protector 600 can protect the injector 116 from energy associated with the plasma formed by the torch and can assist with the relative positioning of the plasma, pushing the plasma away from the outlet tip of the injector 116. In general, the injector protector 600 is formed from a material that is chemically resistant and capable of withstanding prolonged exposure to high temperatures (e.g., without fusion or decomposition) including, but not limited to, silica ($SiO_2$), alumina ($Al_2O_3$), or zirconia ($ZrO_2$). By shielding the injector 116 from the plasma, the injector protector 600 can prevent a false background of material shed from the injector 600 during operation of the torch 102. In implementations, the injector protector 600 is formed from the same material as the inner tube 110 and/or the outer tube 112. In implementations, the injector protector 600 is formed from different material(s) as the inner tube 110 and/or the outer tube 112. In implementations, the injector 116 and the injector protector 600 are fixedly coupled together, such as by being fused together as a unitary construction. In implementations, the injector 116 and the injector protector 600 are removably coupled together, such as by providing a demountable injector (e.g., a threaded demountable injector) that includes one or more mating features to screw into or otherwise removably couple to the injector protector 600.

The injector protector 600 can be arranged with the inner tube 110 such that the annular region 132 is formed between the inner tube 110 and the injector protector 600. The injector protector 600 includes an output end 602 positioned within the outer tube 112 adjacent an output end 604 of the inner tube 110 and an output end 606 of the injector 116. For example, the torch 102 is shown in FIGS. 6A through 6D having the output end 602 of the injector protector 600 substantially flush with the output end 604 of the inner tube 110, however the present disclosure is not limited to such relative positioning. The position of the output end 602 of the injector protector 600 relative to output end 606 of the injector 116 can be provided in a variety of configurations. For example, the output end 602 of the injector protector 600 is shown in FIG. 6A as extending outward towards the torch outlet relative to output end 606 of the injector 116. In FIG. 6B, the output end 602 of the injector protector 600 is shown as being substantially flush relative to output end 606 of the injector 116 (e.g., the output end 602 and the output end 606 terminate at substantially the same longitudinal position between the inlet end 128 and the outlet end 130 of the torch 102). In FIG. 6C, the output end 602 of the injector protector 600 is shown extending beyond the output end 606 of the injector 116 in a direction towards the torch outlet. Such an inset position of the output end 606 of the injector 116 relative to the output end 602 of the injector protector 600 can provide protection of the output end 606 of the injector 116 from the plasma formed by the torch 102, which can prevent the material of the injector 116 (e.g., platinum, sapphire, or other material) from being damaged by the plasma, from being released into the plasma (e.g., which can negatively affect the ICPMS background during analysis), or combinations thereof.

The injector protector 600 is shown formed as a substantially cylindrical tube structure in FIGS. 6A through 6C, however the injector protector 600 is not limited to such configuration. In implementations, the injector protector 600 can include a curved portion, flared portion, tapered portion, or combinations thereof, to conform, match, or otherwise surround portions of the injector 116. For example, the injector protector 600 is shown in FIG. 6D having a tapered section 608 to conform to a tapered injector 116. The tapered injector protector 600 can have the output end 602 inset, flush, or extending beyond the output end 606 of the injector 116 as shown with regard to FIGS. 6A through 6C. For example, FIG. 6D shows an example of the torch 102 with the output end 602 of the tapered injector protector 600 positioned inset with respect to the output end 606 of the injector 116.

Figure 7A:
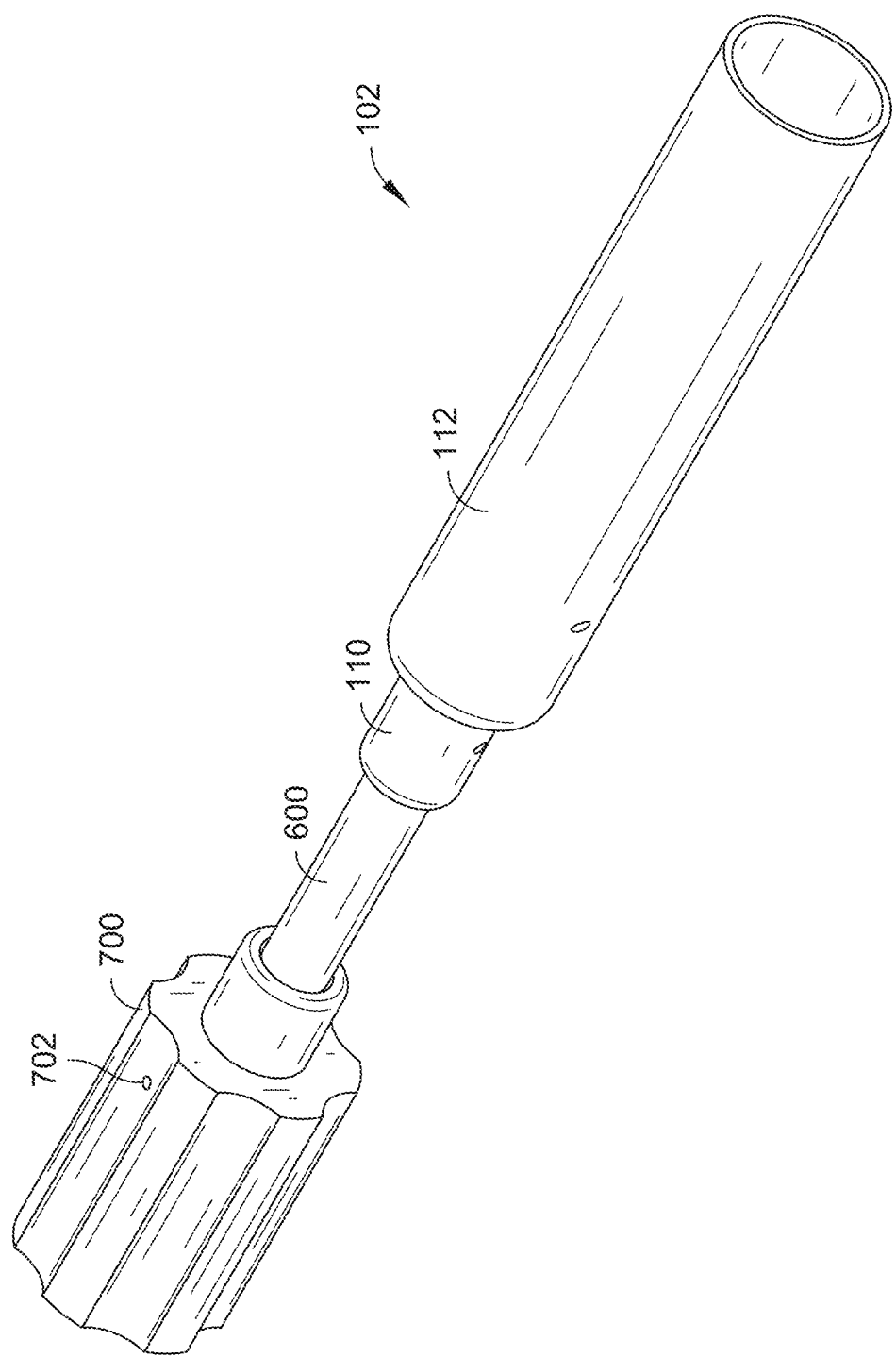
Figure 7B:
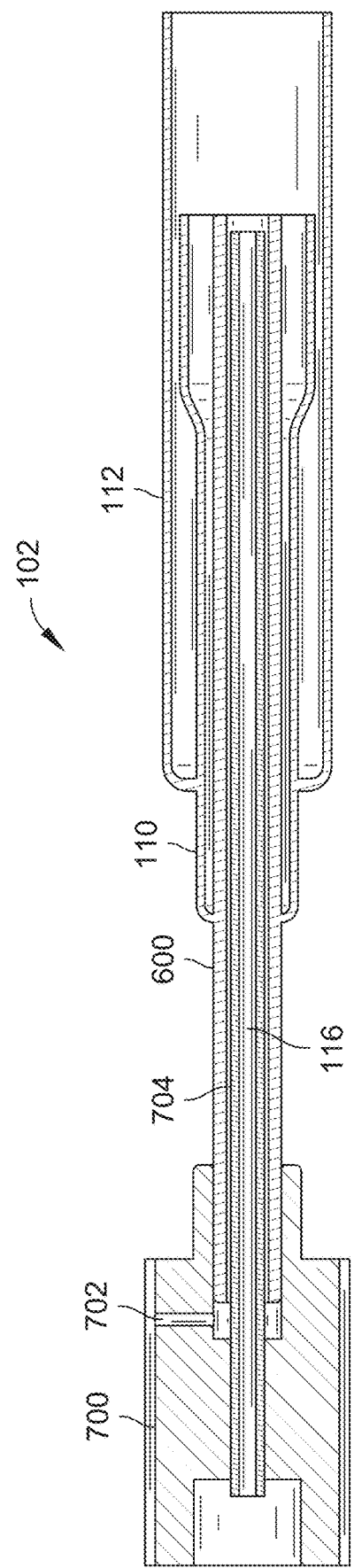

In implementations, the torch 102 can introduce a flow of gas between the injector protector 600 and the injector 116 to facilitate protecting the output end 602 of the injector protector 600 from the plasma formed by the torch 102. For example, the torch 102 is shown in FIGS. 7A and 7B including a gas introduction sheath 700 coupled to the torch 102. The gas introduction sheath 700 is configured to receive input ends of the injector 116 and the injector protector 600 and includes a gas inlet port 702 configured to receive a gas for introduction to an annular space 704 between the injector protector 600 and the injector 116. The gas introduced to the gas inlet port 702 can include, but is not limited to, argon, nitrogen, or the like, or combinations thereof.

In general, the outlet or exit end of an ICP torch is usually the first component of the torch to be damaged during operation using low cooling gas flows. As the torch outlet heats up and devitrifies, the adjacent components of the torch distal from the torch outlet begin to overhead and degrade, thus reducing the useful life of the torch. However, designs constraints limit available solutions since simply shortening the torch is not practically viable: many ICP and ICPMS instruments require the torch to be long enough to insulate the plasma from a load coil or external RF plate during plasma ignition, and the torch length must be long enough to not negatively affect plasma shape or allow deleterious effects from external air entrainment to be observed. In implementations, the torch 102 can include other features that protect the torch 102 from the effects of proximity to the plasma formed by the torch 102.

Figure 8A:
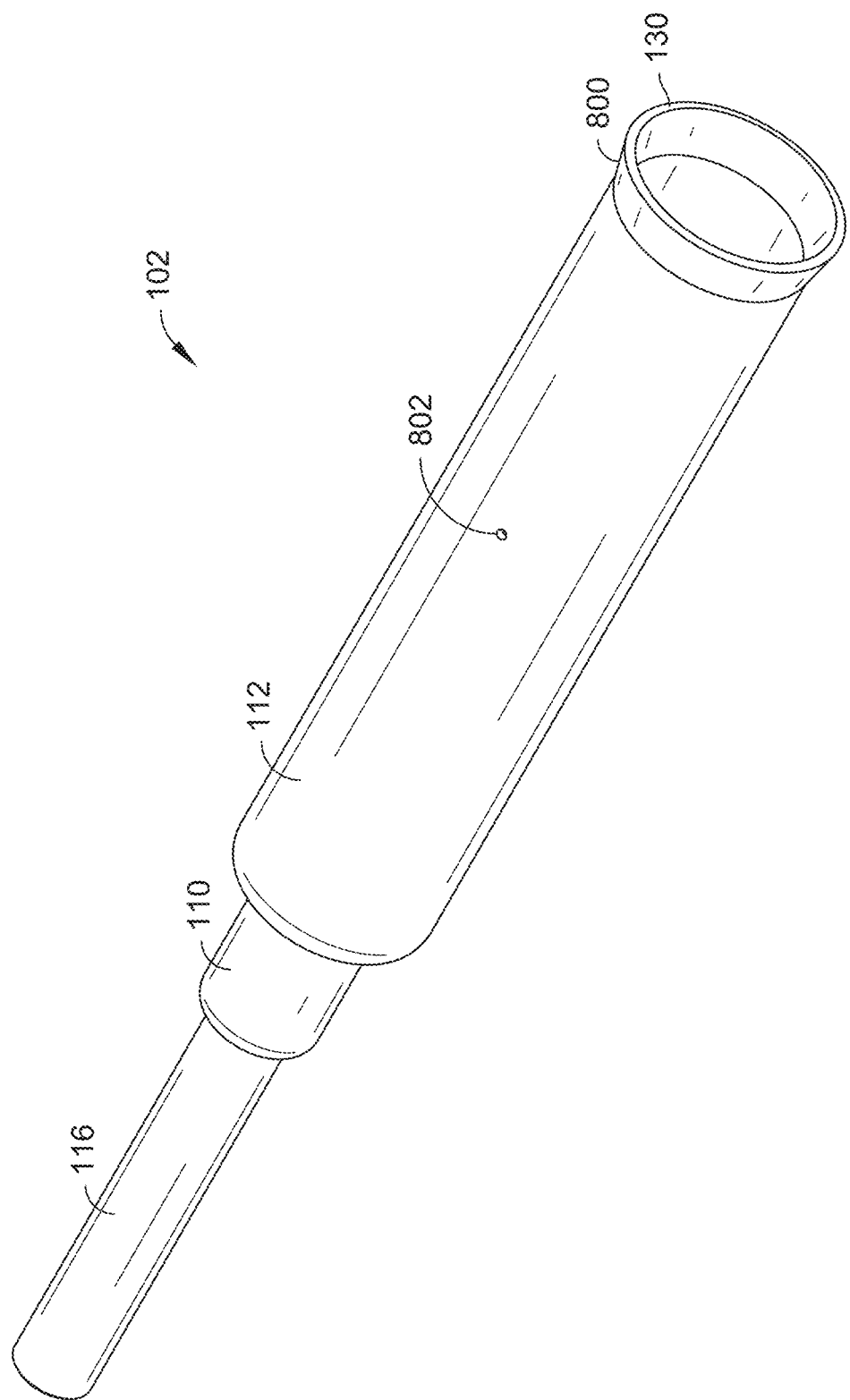
Figure 8B:
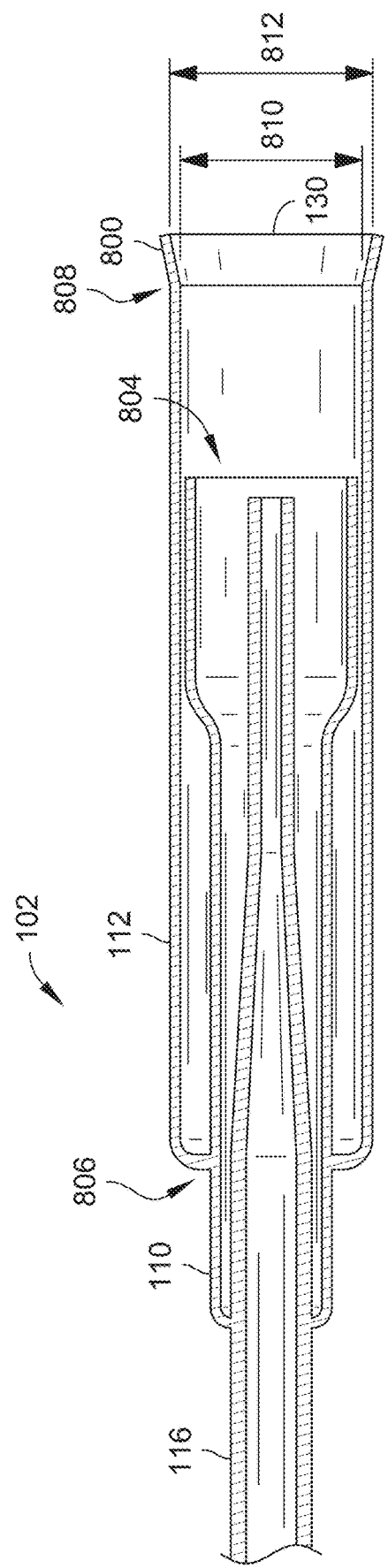

For example, the torch 102 is shown in FIGS. 8A and 8B having a flared outlet 800. The flared outlet 800 is formed by the outer tube 112 adjacent to the outlet end 130 of the torch 102 and can assist with low gas flow operation of the torch 102 while preventing damage to the torch 102 due to plasma effects. The flared outlet 800 displaces the outer tube 112 away from the plasma formed through the combined gases introduced to the torch (e.g. into the annular regions 118 and 132) and through which aerosolized sample is passed via a carrier gas through the injector 116. By positioning the end of the outer tube 112 away from the plasma, the outer tube 112 is afforded additional protection against the effects of the plasma, which substantially reduces devitrification damage to the torch 102 but still provides a laminar flow environment for cooling gas introduced to the annual region 118, allowing for low gas flow operation of the torch 102 (e.g., with cooling gas flow rates of less than about 12 L/min). The flared outlet 800 maintains a length of the torch 102 to facilitate proper positioning in the ICP load coil, to facilitate ignition (e.g., via ignition port 802), and to provide an effectively shorter torch profile while controlling entrainment of external air during operation of the torch 102, while still permitting operation of the torch 102 at low cooling gas flow conditions (e.g., flow rates of less than about 12 L/min). Operation of the torch 102 provides reduced argon consumption, reduce electricity consumption (through lower ionization energy), while avoiding background interference or other contamination due to torch devitrification and overall damage to the injector 116.

In implementations, the flared outlet 800 is formed downstream (i.e., in a direction toward the outlet end 130) from an outlet end 804 of the inner tube 110. For example, the torch 102 is shown in FIG. 8B where the outer tube 112 has a substantially cylindrical shape extending from a connection region 806 with the inner tube 110 to a flared region 808 downstream from the outlet end 804 of the inner tube 110. At the flared region 808, the outer tube 112 increases in width from a first tube width 810 to a second tube width 812 at the outlet end 130 to position the end of the outer tube 112 away from the plasma formed by the torch 102. The difference between the first tube width 810 to a second tube width 812 can vary based on the overall dimensions of the torch 102. For example, in implementations, the second tube width 812 is from about 10 percent to about 20 percent larger than the first tube width 810. In implementations, the transition between the first tube width 810 and the second tube width 812 is a constant increase. In implementations, the transition between the first tube width 810 and the second tube width 812 includes a nonlinear increase in width. In implementations, the transition between the first tube width 810 and the second tube width 812 includes one or more sections having the same width. The flared region 808 generally defines a portion of the longitudinal length of the outer tube 112. For example, the flared region 808 can be from about 4 percent to about 10 percent of the longitudinal length of the outer tube 112.

Figure 9B:
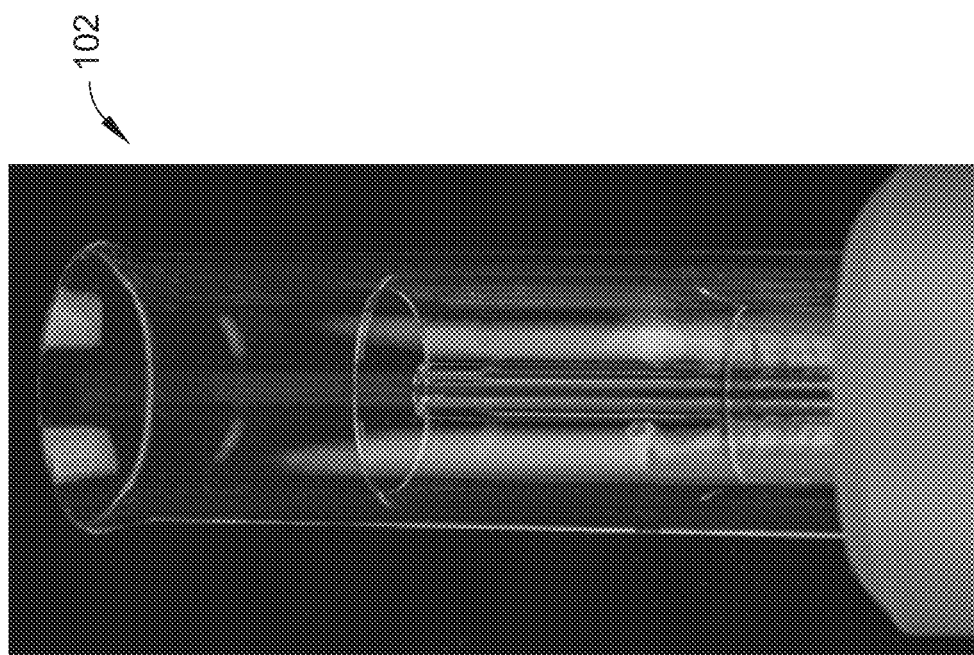
Figure 9A:
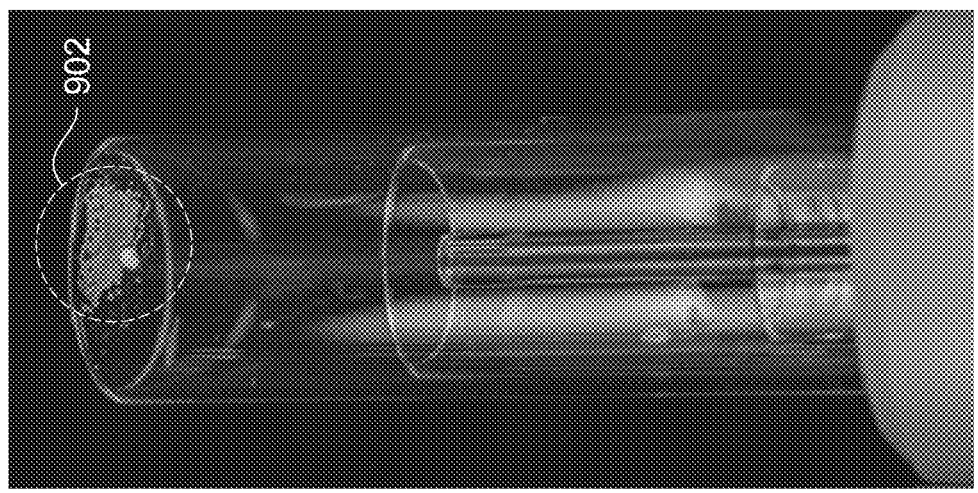

In an example experiment, two torches were subjected to the same low cooling gas flow operating conditions for the same duration with an RF power of 1600 W. A first torch 900, shown in FIG. 9A, included a substantially cylindrical outlet end (i.e., a non-flared end). Following the test duration, the torch 900 developed significant devitrification damage located in region 902 near the end of the non-flared outlet. A second torch 904, shown in FIG. 9B, was structured according to example implementations of the present disclosure. For instance, the torch 904 included the flared outlet 800 formed by the outer tube, while maintaining the same dimensions and features of the inner tube and injector as provided in torch 900. Following the test duration (i.e., the same duration as experienced by the first torch 900), the second torch 904 showed little to no damage in outer tube, without the significant devitrification damage showcased by the first torch 900.

In another example experiment, a torch 102 having the flared outlet 800 was used to analyze samples with an ICPMS analysis system for an approximately 8 hour period to determine the matrix stability of the torch 102. The torch 102 was operated at 1200 W RF power and 13 L/min cooling gas. Calibration involved a 1% nitric acid blank, a 50 ppb spike with 100 ppm Mg, Al, Ca, K, Fe, and Na in 1% nitric acid, and a 100 ppb spike with 100 ppm Mg, Al, Ca, K, Fe, and Na in 1% nitric acid. Multiple samples were loaded with 100 ppm Mg, Al, Ca, K, Fe, and Na in 1% nitric acid, with a sample run lasting for approximately 8 hours (~2 min sample to sample time and ~50 sec analysis time). After the 8 hour period, the torch 102 showed no detectable signs of devitrification while providing relative standard deviation (RSD) values from 1.9% to 2.9% for all species analyzed (Bi, Ce, Cd, Co, Ga, In, Pb, U, Ho, Tb, Cu, Mg, Al, Fe) at 50 ppb and from 0.8% to 2.0% for all species analyzed (Bi, Ce, Cd, Co, Ga, In, Pb, U, Ho, Tb, Cu, Mg, Al, Fe) at 100 ppb.

In another example experiment, a torch 102 having the flared outlet 800 was used to analyze samples with an ICPMS analysis system to determine amounts of Be, In, Ce, and U in given samples. The torch 102 was operated at 1000 W RF power and 10 L/min cooling gas. The daily tuning report of the ICPMS showcased an average 0.6% RSD for all species analyzed over the course of four days of operation.

In another example experiment, a torch 102 having the injector protector 600 (in an inset configuration described with respect to FIG. 6C) was used to analyze samples with an ICPMS analysis system operating under NH3 Cold Plasma conditions with a 2 mm internal diameter platinum injector and a perfluoroalkoxy alkane (PFA) nebulizer. A first test involved 0.1 mL/min NH3 and 1.0 mL/min H2 and resulted in a background equivalent concentration (BEC) of 0.2 ppb for Si (28/28). A second test involved 0.1 mL/min NH3 and 1.5 mL/min H2 and resulted in a background equivalent concentration (BEC) of 0.1 ppb for Si (28/28). A third test involved 0.1 mL/min NH3 and 1.0 mL/min H2 and resulted in a background equivalent concentration (BEC) of 0.1 ppb for Si (28/44). A fourth test involved 0.1 mL/min NH3 and 1.0 mL/min H2 and resulted in a background equivalent concentration (BEC) of 0.5 ppb for Si (28/28). A fifth test involved 0.1 mL/min NH3 and 1.5 mL/min H2 and resulted in a background equivalent concentration (BEC) of 0.5 ppb for Si (28/28). A sixth test involved 0.1 mL/min NH3 and 1.0 mL/min H2 and resulted in a background equivalent concentration (BEC) of 0.3 ppb for Si (28/44).

In another example experiment, a torch 102 having the injector protector 600 (in an inset configuration described with respect to FIG. 6C) was compared against a standard torch having no injector protector present. Each torch was used to analyze Si-28 background on a quadrupole ICPMS under the same conditions, with the injector protector 600 being the primary difference in the experiment. The standard torch having no injector protector resulted in a detection limit (DL) of 0.35 ppb with a background equivalent concentration (BEC) of 9.3 ppb. The torch 102 having the injector protector 600 resulted in a detection limit (DL) of 0.3 ppb with a background equivalent concentration (BEC) of 3.6 ppb, showing drastic improvement on silicon background interference for using torches for analysis of high purity materials.

The torches 102 described herein can include all of the features described herein, or combinations of subsets of the features described herein. For instance, the torch 102 can include the plurality of inlet ports 124 and/or 134 in combination with the injector protector 600 and in combination with the flared outlet 800. As another example, the torch 102 can include a single inlet port 124 and a single inlet port 134 in combination with the injector protector 600 and in combination with the flared outlet 800. As another example, the torch 102 can include the plurality of inlet ports 124 and/or 134 in combination with the injector protector 600 without the flared outlet 800. As another example, the torch 102 can include the plurality of inlet ports 124 and/or 134 in combination with the flared outlet 800 without the injector protector 600.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An inductively coupled plasma torch, comprising:
   a tubular sample injector configured to receive an aerosolized sample in an interior defined by walls of the tubular sample injector;
   an inner tube surrounding at least a portion of the tubular sample injector to form a first annular space between the inner tube and the walls of the tubular sample injector, the inner tube defining a plurality of inlet ports for introduction of an auxiliary gas into the first annular space, the plurality of inlet ports linearly aligned and arranged tangent to the inner surface of the inner tube to provide laminar flow of the auxiliary gas within the first annular region; and
   an outer tube surrounding at least a portion of the inner tube to form a second annular space, the outer tube defining at least one inlet port a plurality of inlet ports for introduction of a cooling gas into the second annular space, the plurality of inlet ports being linearly aligned to facilitate tangential flow under laminar flow conditions, the outer tube having a flared region at an outlet of the outer tube.

2. The inductively coupled plasma torch of claim 1, wherein the flared region is positioned downstream from an outlet end of the inner tube, the outlet end of the inner tube positioned within the outer tube.

3. The inductively coupled plasma torch of claim 2, wherein the outer tube increases in width from a first tube width to a second tube width at the outlet of the outer tube in the flared region.

4. The inductively coupled plasma torch of claim 2, wherein the increase in width from the first tube width to the second tube width is a constant increase.

5. The inductively coupled plasma torch of claim 2, wherein the increase in width from the first tube width to the second tube width is a nonlinear increase.

6. The inductively coupled plasma torch of claim 2, wherein the flared region includes one or more regions of constant width in between the first tube width and the second tube width.

7. The inductively coupled plasma torch of claim 2, wherein the second tube width is from about 10 percent to about 20 percent larger than the first tube width.

8. The inductively coupled plasma torch of claim 1, wherein the flared region is from about 4 percent to about 10 percent of a length of the outer tube.

9. An inductively coupled plasma torch, comprising:

an inner tube configured to receive at least a portion of a tubular sample injector; and an outer tube surrounding at least a portion of the inner tube to form an annular space, the outer tube defining a plurality of inlet ports for introduction of a cooling gas into the annular space, the plurality of inlet ports being linearly aligned to facilitate tangential flow under laminar flow conditions, the outer tube having a flared region at an outlet of the outer tube, wherein the flared region is positioned downstream from an outlet end of the inner tube, the outlet end of the inner tube positioned within the outer tube.

10. The inductively coupled plasma torch of claim 9, wherein the outer tube increases in width from a first tube width to a second tube width at the outlet of the outer tube in the flared region.

11. The inductively coupled plasma torch of claim 9, wherein the increase in width from the first tube width to the second tube width is a constant increase.

12. The inductively coupled plasma torch of claim 9, wherein the increase in width from the first tube width to the second tube width is a nonlinear increase.

13. The inductively coupled plasma torch of claim 9, wherein the flared region includes one or more regions of constant width in between the first tube width and the second tube width.

14. The inductively coupled plasma torch of claim 9, wherein the second tube width is from about 10 percent to about 20 percent larger than the first tube width.

15. The inductively coupled plasma torch of claim 9, wherein the flared region is from about 4 percent to about 10 percent of a length of the outer tube.

16. A method of operating an inductively coupled plasma torch, comprising:
introducing an aerosolized sample to an interior of a tubular sample injector of an inductively coupled plasma torch, the inductively coupled plasma torch including:

an inner tube surrounding at least a portion of the tubular sample injector to form a first annular space between the inner tube and the walls of the tubular sample injector, the inner tube defining a plurality of inlet ports for introduction of an auxiliary gas into the first annular space, the plurality of inlet ports linearly aligned and arranged tangent to the inner surface of the inner tube to provide laminar flow of the auxiliary gas within the first annular region, and an outer tube surrounding at least a portion of the inner tube to form a second annular space, the outer tube defining a plurality of inlet ports for introduction of a cooling gas into the second annular space, the plurality of inlet ports being linearly aligned to facilitate tangential flow under laminar flow conditions, the outer tube having a flared region at an outlet of the outer tube;

introducing the auxiliary gas into the first annular space of the inductively coupled plasma torch via the plurality of inlet ports of the inner tube; and introducing the cooling gas at a flow rate of less than 12 L/min into the second annular space of the inductively coupled plasma torch via the plurality of inlet ports of the outer tube.

17. The method of claim 16, wherein the flared region is positioned downstream from an outlet end of the inner tube, the outlet end of the inner tube positioned within the outer tube.

18. The method of claim 17, wherein the outer tube increases in width from a first tube width to a second tube width at the outlet of the outer tube in the flared region.

19. The method of claim 17, wherein the second tube width is from about 10 percent to about 20 percent larger than the first tube width.

20. The method of claim 17, wherein the flared region is from about 4 percent to about 10 percent of a length of the outer tube.

* * * * *